May 27, 1969 J. A. DRAEGER ET AL 3,446,061
OCULAR INSTRUMENTS
Filed Nov. 1, 1965

Inventor:
JÖRG A. DRAEGER
FRIEDRICH J. KLEIN

United States Patent Office 3,446,061
Patented May 27, 1969

3,446,061
OCULAR INSTRUMENTS
Jörg A. Draeger, Hamburg, and Friedrich J. Klein, Wedel, Holstein, Germany, assignors to J. D. Moller Optische Werke G.m.b.H., Wedel, Holstein, Germany
Filed Nov. 1, 1965, Ser. No. 505,880
Claims priority, application Germany, Sept. 16, 1965, M 66,655
Int. Cl. A61b 9/00
U.S. Cl. 73—80                                    7 Claims

ABSTRACT OF THE DISCLOSURE

An applanation tonometer includes a casing constructed to be held in the hand. A microscope is mounted on the casing as is also an adjustable application plate arranged to engage the head of a subject. An arm is pivotally mounted in the casing and has a free end projecting therefrom and carrying a transparent pressure body for application against the cornea of the eye to be tested. A scale is movably mounted in the case and connected by a lever and rod system in the case to the arm, the scale indicating the measuring force exerted on the cornea. The transparent pressure body has its optical axis aligned with the optical axis of the microscope. A light source in the casing directs light at an angle to the applanation surface of the transparent pressure body and also illuminates the scale. An electric motor in the casing is in driving relation with the lever and rod system.

BACKGROUND OF THE INVENTION

This invention relates to an applanation tonometer for measuring intra-ocular tension, consisting of a lighting arrangement, a measuring device having pressure bodies applicable against the cornea of the eye to be tested, with a swivel arm and counterweight, and a microscope for adjusting and observing the flattened surface.

For measuring intra-ocular tension applanation tonometers are known, which measure the force required to flatten a given area of the cornea. In the Maklakoff tonometer the unit of measurement used is the flattening area which a given weight produces. Serious methodical defects occur however with this appliance, which results in considerable inaccuracies in measurement. In order to obtain a more satisfactory measurement of the flattened surface, Romer used a telescope with division of the image by prisms, but this appliance was very unwieldy. Perkins' proposal pursued the same idea, but used instead of the telescope a simple lens of +18 diopters for observing the flattened area. However, even with this appliance, it was not possible to obtain accurate values for the measurements, due to the use of a variable flattened surface. The hand applanation tonometer developed by Goldmann and Schmidt substantially corresponds to Goldmann's slit-lamp tonometer; here again however it can only be used for tests on recumbent patients. With this tonometer the pressure body is compensated by the application of a counterweight in such a way that it can only be applied vertically. A measuring ocular, fitted to the tonometer, replaces the slit-lamp microscope; the lighting is co-axial to the observation ray path. The loading can be varied by a screw arrangement on the rear side of the appliance.

Known applanation tonometers are suitable either solely for taking measurement on recumbent patients or solely for taking measurements on seated patients. Appliances independent of the slit-lamp are associated with a strictly vertical application, as otherwise if there were any inclination of the instrument serious errors in measurement would occur.

An object of the present invention is to produce an applanation tonometer which can be used with equal accuracy for measurements both on recumbent and also on seated patients, without corrections of the results being necessary. This object is attained in accordance with the invention by the tonometer case being formed as a hand appliance and there being arranged in the apparatus case, provided with an adjustable application plate applicable for measuring purposes to the head of the person being tested, a swivel arm, compensated for each direction of measurement, for the pressure body, a light source for illuminating the applanation surface at an angle and for illuminating a scale connected with the swivel arm of the pressure body via a driven lever rod, for reading off the particular measuring force set, and an observation microscope lying in the observation ray path of the pressure body.

In accordance with a further feature of the invention the tonometer is characterized by a substantially U-shaped case. In one arm of the case, the swivel arm of the pressure body is held freely movable, while the free end of the case arm, which accommodates the lever rod connected with the swivel arm of the pressure body, carries the observation microscope and the application plate. The swivel arm of the pressure body takes the form of a double-armed lever. The free end, lying opposite the pressure body, of one lever arm of the swivel arm is connected via a tension spring with the lever rod, which is connected to a spindle with a spindle nut, carrying the scale for reading the measuring force set, which spindle can be driven by means of the motor fitted in the case arm forming a handle.

The observation microscope consists of a front lens lying opposite the transparent pressure body, two halves of an objective lying in the ray path of the microscope, with their optical axes arranged offset in relation to one another, an ocular and a reticulation plate arranged between this and the two objective halves, on which plate an image of the scale can be formed by means of an objective.

A specific embodiment of the invention will now be described by way of example with reference to the accompanying drawing, in which.

Figure 1:
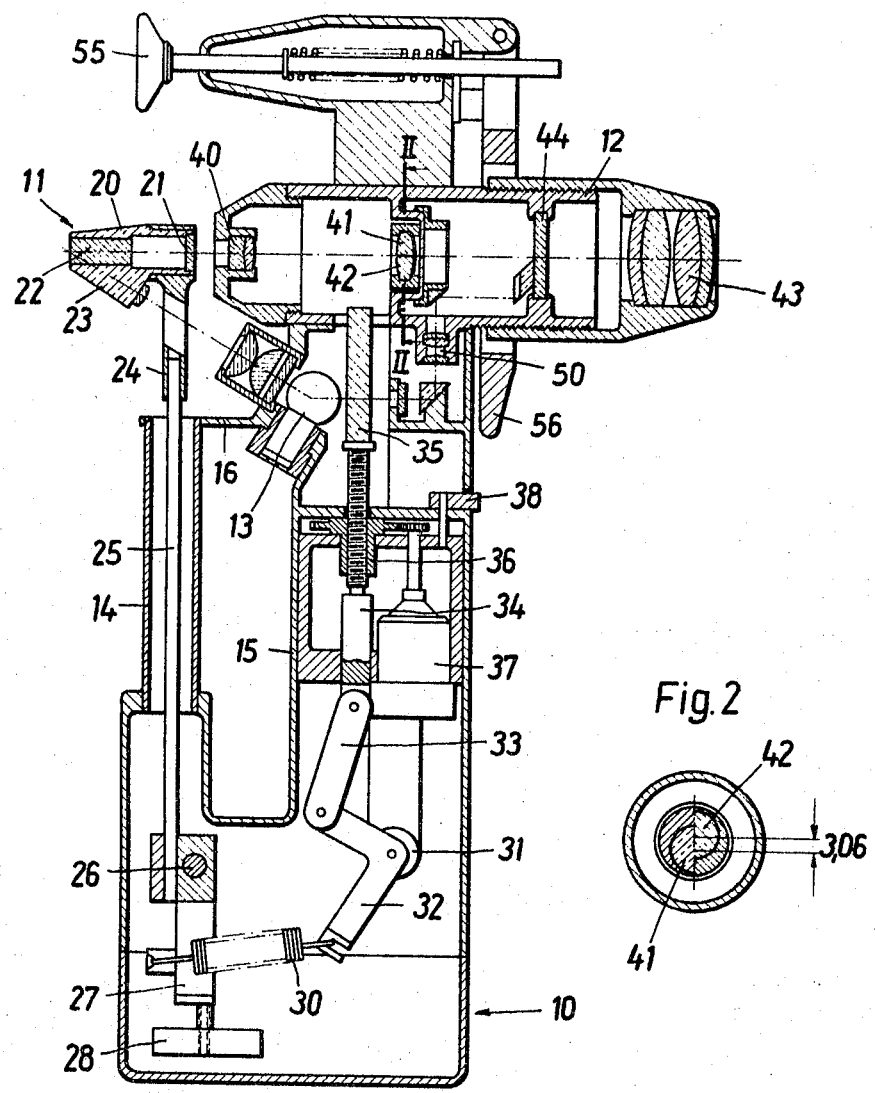
FIGURE 1 shows an applanation tonometer in vertical section.

In FIGURE 1, the applanation tonometer consists of a case 10, a pressure body 11, an observation microscope 12 and a light source 13. The case 10 consisting of plastics material or metal, is made substantially U-shaped with two arms 14 and 15 connected together at 16. Of the two arms 14 and 15, the arm 15 forms a handle.

The pressure body 11 consists of a substantially cylindrical tube 20 of translucent material, closed at both ends by discs 21 and 22, likewise of translucent material, and having laterally a prism 23. The pressure body 11 is connected by means of a holding system 24 to a swivel arm 25, formed as a double-armed lever and which is surrounded by the tubular case arm 14. The diameter of the case arm 14 is such that the swivel arm 25 is freely movable in the case arm 14. The swivel arm 25 can swivel round a spindle 26. The lever arm end 27 lying opposite the pressure body 11 carries an adjustable counterweight 28.

The force required for applying the pressure body 11 on the cornea of the eye to be tested is produced by means of a tension spring 30 which engages at the end of the lever arm 27. The free end of the tension spring 30 is fixed to the free end of a toggle lever 32 which can swivel round the spindle 31, while the other free end of the toggle lever 32 is connected to an articulation rod 33 which carries at its free end a spindle 34 with a scale 35 for reading off the particular measuring force set.

The axial displacement of the spindle 34 is effected by means of a gear nut 36 which is driven by an electric motor 37 controlled by the actuating switch 38. The motor 37 is supplied with current through a transformer (not represented in the drawing). A movement of the spindle 34 is transmitted by the articulation rod 33 to the toggle lever 32. When the toggle lever 32 is rotated the tension spring 30 is stressed so that by swivelling the swivel arm 25 the requisite force is produced at the pressure body 11.

The complete arrangement is such that while the swivel arm for the pressure body 11 is guided in the case arm 14 of the case 10, the device for the transmission of force for the pressure body 11 is fitted in the case arm 15 forming a handle.

For illumination of the applanation surface and of the scale 35, light source 13 is provided, which consists of an incandescent lamp, which like the motor is supplied with current from the transformer.

Figure 2:
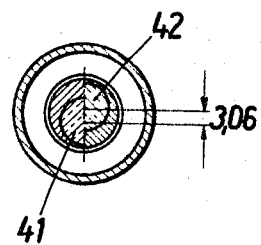
FIGURE 2 is a section taken along the line II—II in FIGURE 1.

The observaton microscope 12 consists of a tubular case which is fixed to the free end of the case arm 15. There are arranged in the observation ray path of the microscope 12, in the microscope case adjacent to the pressure body 11, a front lens 40 and also two objective halves 41, 42, associated with this. The two objective halves 41 and 42 are incorporated in the observation microscope 12 in such a way that their optical axes are offset in relation to one another by 3.06 mm. (FIGURE 2). An ocular 43 is provided at the end of the microscope case lying opposite the front lens 40. Between the ocular 43 and the two objective halves 41 and 42 is provided a reticulation plate 44. By the construction of the observation microscope with two objective halves 41 and 42 with optical axes offset in relation to one another, two images, offset by 3.06 mm. of the applanation surface produced by the pressure body 11, can be seen in the ocular 43. When measurement takes place, the force at the pressure body 11 is to be so increased that the two opposed images in the ocular 43 come into contact with one another in corresponding manner. The measuring force set can be read off on the scale 35. In order to simplify the reading of the values measured, an image of the scale 35 is formed in the reticulation plate plane of the ocular by means of an objective 50.

In order to be able to hold the tonometer steadily on the eye, there is fixed to the case arm 15 above the observation microscope 12 a spring-loaded application plate 55 which makes it possible, by means of an actuating lever 56 gripping round the observation microscope 12, to bring the tonometer into the particular position of use required, and to fix it in this. The actuating lever 56 together with the on and off switch 38 for the drive motor 37 are so arranged that the application plate 55 and the switch 38 can easily be actuated by the hand gripping the tonometer.

The special advantage obtained through the invention is that during measurement the tonometer can easily be held perfectly still and can be operated by one hand. All the essential components of the tonometer such as the observation microscope, the pressure body and lighting arrangement, are accommodated in a handy case. The measuring force exerted by the pressure body is indicated on the scale 35 and read off in the ocular 43. Adjustment, measurement and reading of the measuring force can be effected without the appliance having to be put down. The drive motor 37 accommodated in the appliance case makes possible accurate adjustment and speedy and continuance variation in the measurement force. To avoid any disturbing movement during the measuring there is fitted to the head of the appliance case an application plate 55 sprung in the zero position and which can be locked in any desired deflection by thumb pressure, which permits in each case optimum adaptation to the damage to the sight of the person being tested. The lever for adjusting the srung application plate 55 and the actuating switch for the drive motor are accommodated in the handle 15 of the appliance case 10; they are easily operated by the thumb of the hand gripping the handle 15, without any canting of the appliance or additional pressure occurring. The front surface of the pressure body 11 lies, in the zero position of the measuring lever, in the sharp plane of the microscope objective. Movement in the direction of movement of the measuring lever does not increase the measuring pressure, only the image of the flattened surface does not appear sharp, so that the optimum measuring plane can easily be found.

The arrangement of the observation microscope of the pressure body and of the light arrangement including the scale on which the measured value can be read off, in a case forming a handle, further makes it possibe lt to use the applanation tonometer in any position of use. In any position desired of the person to be tested, measurements can be carried out without any deviations occurring in the measured values. The arrangement of the lighting system in the appliance case makes possible, in addition to a satisfactory lighting of the applanation surface, at the same time the lighting of the measurement scale mirrored in the observaton ocular.

The invention is not restricted to the embodiment described and represented. Variations in the form of the case lie within the scope of the invention. Instead of a substantially U-shaped case there may also be used a single coherent case forming a handle and which then accommodates the observation microscope, the lighting and measuring device in a corresponding arrangement.

What we claim is:

1. An applanation tonometer comprising, in combination, a case constructed to be held in the hand; an arm pivotally mounted in said case and having a free end projecting therefrom; a transparent pressure body mounted on the free end of said arm for application against the cornea of the eye to be tested; an application plate adjustably mounted on said case for application to the subject's head for measurement purposes; a scale movably mounted in said case; a lever and rod system in said case connecting said arm and said scale, said scale indicating the measuring force exerted on the cornea by said pressure body; a light source in said case positioned to direct light on the applanation surface of said body at an angle to the optical axis of said body, and to illuminate said scale; driving means in said case operable to drive said lever and rod system; and an observation microscope on said case and aligned with the optical axis of said pressure body.

2. An applanation tonometer, as claimed in claim 1, in which said case is substantially U-shaped including two arms, said first mentioned arm being pivotally mounted in one of said case arms; the other case arm forming a handle and accommodating said lever and rod system as well as mounting said observation microscope and said application plate.

3. An applanation tonometer, as claimed in claim 1, in which said arm is formed as a double-arm lever pivoted intermediate its ends; a tension spring in said case connecting the free end of said arm within said case to said lever and said rod system; a threaded spindle carrying said scale and connected to said lever rod system; said driving means including a gear nut threadedly engaged with said spindle and a motor in said case driving said nut.

4. An applanation tonometer, as claimed in claim 1, in which said observation microscope consists of a front lens positioned adjacent said transparent pressure body, two objective halves positioned in the path of light rays through said microscope and having optical axes laterally offset relative to one another, an ocular and a reticulated plate positioned between said ocular and said two objective halves.

5. An applanation tonometer, as claimed in claim 4, in which said reticulation plate has an objective formng an image of said scale.

6. An applanation tonometer, as claimed in claim 1, including first optical means operatively associated with said light source and having an optical axis intersecting said light source and intersecting the optical axis of said pressure body at an angle, and a second optical system intersecting said light source and providing a ray path for illuminating said scale.

7. An applanation tonometer, as claimed in claim 1, including a spring-loaded holding rod movably mounted on said case to extend parallel to the optical axis of said observation microscope, said application plate being mounted on said holding rod; said driving means including a drive motor in said case and controlled by an on-off switch on said case; and a clamping lever frictionally embracing said microscope and secured to said holding rod, said clamping lever having an end adjacent said on-off switch; said applicatoon plate being adjustable by pressure applied to the operating end of said clamping lever.

References Cited

UNITED STATES PATENTS

| 3,070,997 | 1/1963 | Papritz et a l. | 73—80 |
| 3,301,131 | 1/1967 | Benford | 73—80 |

FOREIGN PATENTS

| 867,128 | 5/1961 | Great Britain. |

JAMES J. GILL, *Primary Examiner.*

C. I. McCLELLAND, *Assistant Examiner.*